United States Patent Office 3,499,394
Patented Mar. 10, 1970

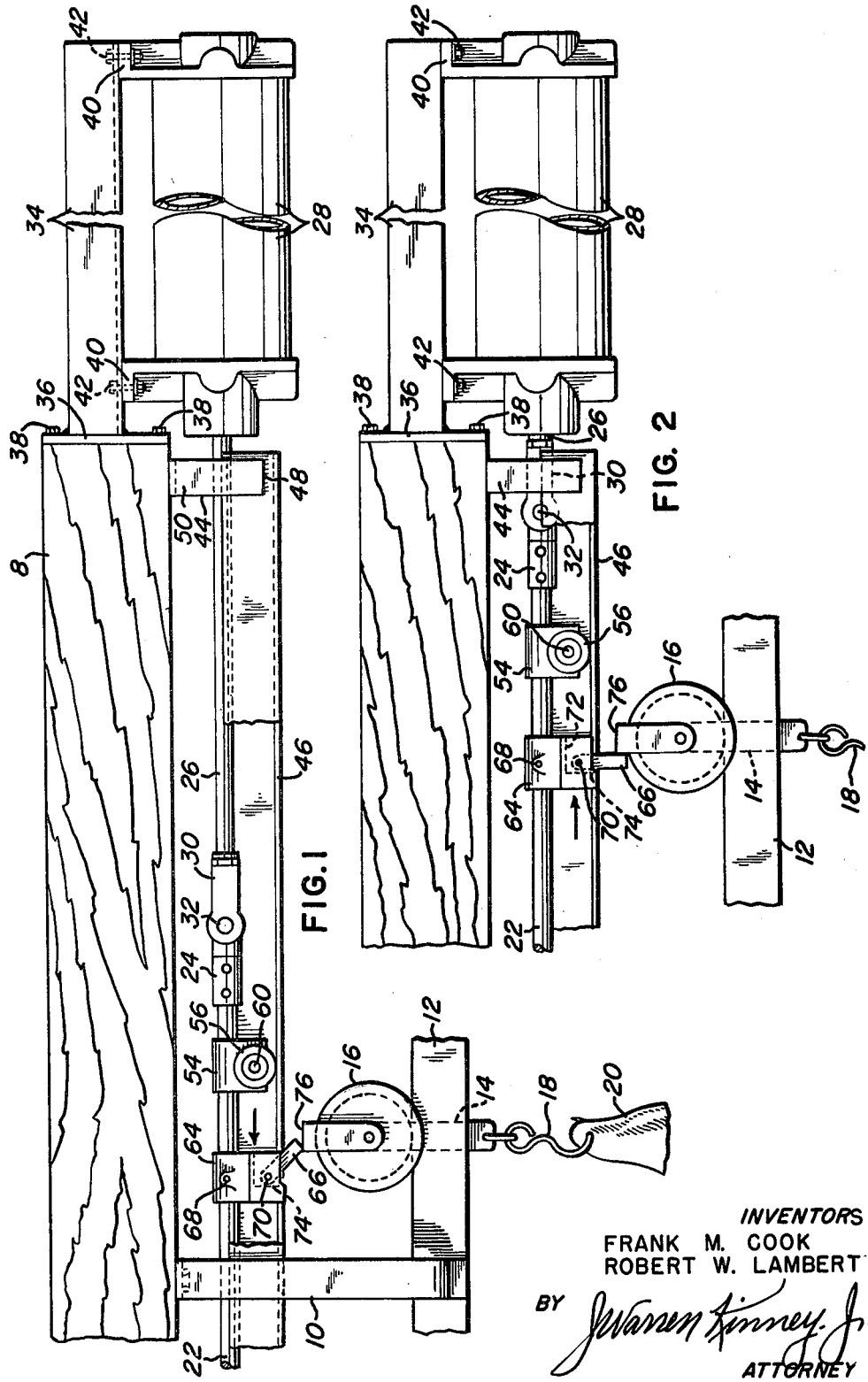

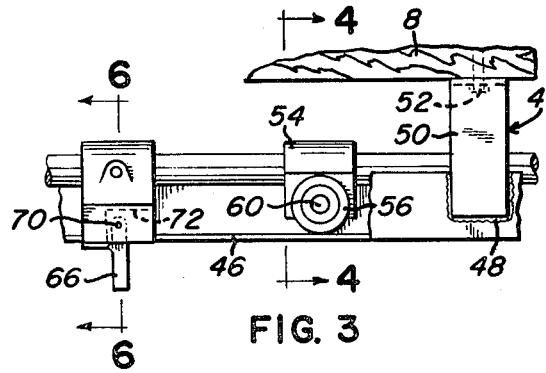
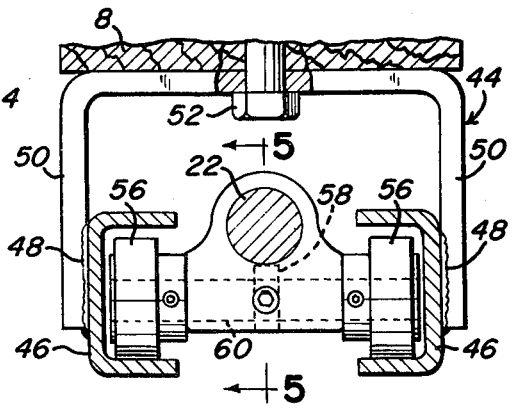
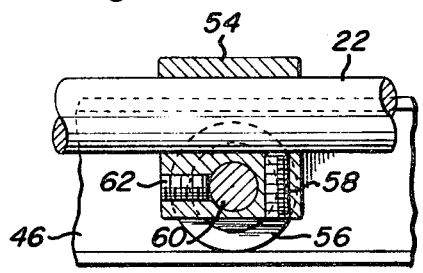
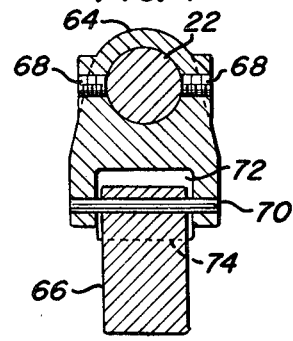
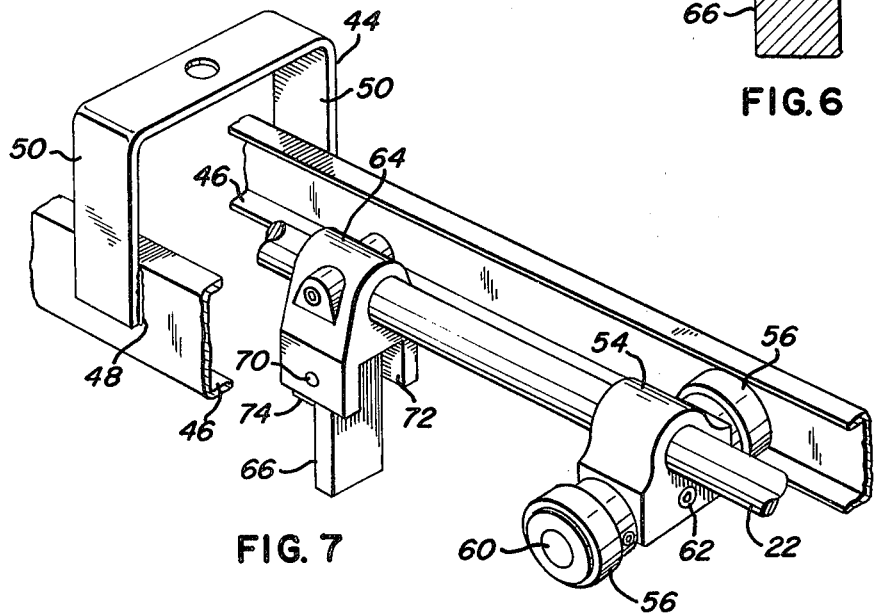

3,499,394
TROLLEY ADVANCING AND SPACING DEVICE
Robert W. Lambert, Burlingame, and Frank M. Cook, San Francisco, Calif., assignors to Cincinnati Butchers' Supply Company, Cincinnati, Ohio, a corporation of Ohio
Filed Sept. 15, 1967, Ser. No. 668,316
Int. Cl. B61b *13/04;* B61k *7/00*
U.S. Cl. 104—162                                14 Claims

ABSTRACT OF THE DISCLOSURE

The device utilizes a fluid motor and reciprocable pusher rod in axial alignment to occupy the space between a trolley rail and an overhead support for the rail, thereby to minimize the need for head-room in applying the device to existing conveyor installations; and an included ball-bearing carriage supporting a reciprocable pusher rod over a track for the carriage provides for virtually frictionless advancement and retraction of trolley impellers used in relocating a succession of trolleys in uniformly spaced relationship upon a trolley rail. Simplicity of parts, and of installation and maintenance, are among the primary objectives along with power conservation and minimal initial manufacturing cost.

---

The present invention relates to a trolley advancing and spacing device, and embodies improvements upon the copending application of Lowell K. Adams and Albert D. Davis, entitled Walking Beam, filed Aug. 10, 1966, and bearing Ser. No. 571,564, now Patent No. 3,450,064.

The purpose of the device is to advance and space uniformly upon a conveyor rail, article-suspending trolleys that are fed to the spacing device without regard to uniformity of spacing occurring between successive article-suspending trolleys. While the device of the invention is suitable for other applications, it is disclosed herein by way of example, as an apparatus for uniformly spacing and advancing animal carcasses in meat dressing plants or the like, at locations or stations where uniform spacing of the carcasses upon conveyor rails is helpful or necessary to economical operation of the processing plant.

An object of the invention is to provide a simplified, compact, and durable apparatus for uniformly spacing and advancing articles successively upon a conveyor rail, the articles having been fed to said apparatus without regard to uniformity of spacing.

Another object of the invention is to provide apparatus for the purpose stated, which is so constructed that it may be applied with ease and dispatch to existing conveyor equipment in a meat processing plant, as well as to new equipment for installation in such a plant or establishment wherein the apparatus may be advantageously employed.

A further object of the invention is to provide a simplified and relatively inexpensive apparatus of the character stated, which is constructed to operate with a high degree of dependability, free of maintenance servicing, so as to offer no interference with continuity of processing plant operation.

Another object is to provide apparatus of the character stated which employs a simplified and effective reciprocable pusher rod assembly in line with an actuating cylinder and carrying one or more drop fingers for properly engaging, spacing, and advancing article-suspending trolleys economically, positively, and with such precision as to ensure a high degree of continuity in the meat handling procedure.

Another object of the invention is to provide structural improvements in apparatus of the type referred to, which materially facilitate and expedite commercial installations of such apparatus, with great savings of time, labor, and expense.

The foregoing and other objects are attained by means described herein and illustrated upon the accompanying drawings, in which:

FIG. 1 is a fragmentary side elevational view of the improved trolley advancing and spacing device mounted upon an overhead support member, the reciprocable pusher rod thereof being shown partly extended.

FIG. 2 is a view similar to FIG. 1, showing the reciprocable pusher rod retracted and in the act of positioning a wheeled trolley upon a trolley rail.

FIG. 3 is a fragmentary side view illustrating a wheeled carriage and a trolley impeller in operative association with a reciprocable pusher rod and supporting means therefor.

FIG. 4 is an enlarged cross-sectional view taken on line 4—4 of FIG. 3.

FIG. 5 is an enlarged cross-sectional view taken on line 5—5 of FIG. 4.

FIG. 6 is a cross-sectional view taken on line 6—6 of FIG. 3.

FIG. 7 is a fragmentary perspective view, parts being broken away, showing the elements illustrated by FIG. 3.

In the several drawing figures, the reference character 8 denotes a timber or other suitable overhead support, from which is suspended a rigid trolley rail 12 as by means of a series of rigid rail hangers 10 disposed along the length of the rail. The rail 12 may extend a substantial distance throughout a building, very often in serpentine fashion, and will ordinarily support a multiplicity of wheeled trolleys 14 movable individually along the length of the rail with the aid of rollers 16 which ride upon the upper edge of the rail. The hangers 10 may be offset to one side of rail 12, so as to permit the trolleys to pass the hangers as the trolleys advance along the rail. Each trolley may carry a hook 18 or equivalent device for suspending articles 20 to be conveyed, such articles being herein shown an animal carcasses by way of example.

Under some conditions, trolleys carrying carcasses may accumulate at the left-hand end of rail 10, FIG. 1, with the carcasses abutting one another. Such carcasses are to be separated from one another in succession, to facilitate further processing, and such separating or spacing of the carcasses is the primary purpose and function of the apparatus herein disclosed. The apparatus performs to space and davance the carcasses at the right of hanger 10 in FIG. 1, with uniformity of spacing between successive carcasses while suspended from rail 12.

The apparatus may comprise an elongated pusher rod 22 having fixed at one end thereof a coupling member 24, whereby the pusher rod may be connected to the outer end of the reciprocable piston rod or drive rod 26 of a fluid motor 28, which acts to reciprocate the piston rod and associated pusher rod between predetermined limits of extension and retraction. Motor 28 may be a double-acting pneumatic or hydraulic cylinder motor, with conventional controls for alternately extending and retracting the piston rod thereof equal distances. The outer end of piston rod 26 may carry an adjustable clevis 30 and associated pin 32, or equivalent means, for connection thereof with the adjacent end of pusher rod 22.

It may here be noted that piston rod 26 and pusher rod 22 are disposed in substantial axial alignment, with a direct connection therebetween proivding for simple, inexpensive, and reliably operative assembly. The arrangement eliminates noise, lost-motion of parts, and lubrication problems, add utilizes the full power of motor 28 for actuating the pusher rod without frictional drag, as will appear more fully hereinafter.

Motor 28 may be supported very simply upon support member or beam 8, by means of a bracket 34 having a base 36 fixed to support member 8 as by means of bolts 38 or other suitable fasteners. The mounting ears 40 of the motor may be fixed to bracket 34 as at 42, with the piston rod axially aligned with pusher rod 22.

Beneath the lower face of support member 8 may be fixedly located a track suspender 44, best shown in FIGS. 4 and 7, arranged to carry a pair of spaced parallel tracks 46. As will be understood, two or more suspenders will be needed along the length of tracks 46, to provide adequate support therefor. The tracks are arranged in spaced parallelism with, and at a higher elevation than, the rail 12 which supports the trolleys 14. The tracks may conveniently and desirably occupy the space between rail 12 and its overhead support member 8 with no additional head-room required, this being a highly important factor in some installations.

The tracks 46 may comprise channel irons as shown, welded or otherwise secured at 48 to the spaced paralled depending arms 50 of suspender 44. The suspenders may be fixed to support member 8 in any appropriate manner, as by means of bolts 52 or equivalent fasteners.

The reference numeral 54 indicates a carriage provided with a pair of wheels 56 adapted to ride upon the paralled tracks 46 lengthwise thereof. The carriage is fixedly mounted upon pusher rod 22, as by means of a set screw 58, FIG. 4, and may be located thereon at desired distances from coupler 24. The wheels of the carriage may be constituted of ball bearings fixed to a transverse shaft 60, with the outer races of the ball bearings performing service as wheels. A set screw 62 may anchor the shaft 60 upon the carriage body.

The wheels 56 constitute a virtually frictionless support for carriage 54 upon tracks 46, and serve to maintain substantial alignment of pusher rod 22 with piston rod 26 during reciprocation of said rod by motor 28. If necessary or desirable, more than one carriage 54 may be applied to the pusher rod for support thereof.

The reference character 64 indicates a trolley pusher or impeller, which includes a pivoted drop finger 66 to engage a trolley as in FIG. 2, for moving the trolley to the right along rail 10 a distance determined by the stroke of piston rod 26. The body portion of the pusher or impeller is adapted for adjustment along, and fixation to, the pusher rod 22. Suitable set screws 68 may be provided for the purpose.

Drop finger 66 may have one end pivoted at 70 within a recess 72 of the impeller body, so that the free or outer end of the drop finger may swing in a vertical plane which includes the longitudinal axis of the pusher rod. From a substantially vertical depending position, the drop finger 66 may swing in one direction only about pivot 70. As FIG. 1 clearly indicates, the direction of swing is to be the direction in which a trolley 14 is to be advanced thereby along rail 12. Swinging of the drop finger from the vertical in the opposite direction, may be precluded by a wall or heel 74 of recess 72 spaced beneath the level of pivot 70 and adapted to serve as an abutment against which an intermediate portion of the drop finger may impinge.

In the light of the foregoing explanation, FIG. 1 will be understood to show how movement of pusher rod 22 and the attached impeller 64 to the left, will cause the drop finger to override the top 76 of trolley harp 14, without moving the trolley along rail 12. After drop finger 66 passes beyond the trolley, however, it will drop to the vertical position of FIG. 2 in readiness to advance the trolley to the right as pusher rod 22 retracts by action of the motor 28. Movement of the trolley toward the right in FIG. 2, will be determined by the retractile stroke of piston rod 26, and the trolley will be thereby finally located with respect to rail 12.

As in many conventional fluid motor constructions, the length of stroke of the piston rod may be regulated as desired, and a fluid motor so regulatable may be here employed.

Once a trolley has been advanced and relocated upon rail 12 as above explained, fluid motor 28 will be actuated to project the pusher rod and impeller 64 to the left, as in FIG. 1, enabling the drop finger of the impeller to pick up a succeeding trolley and move it to the right along rail 12, the preceding trolley having been moved out of the way in the meantime. It should be understood that the pusher rod 22 may carry any number of impellers 64 spaced apart thereon, and operative to advance a plurality of trolleys simultaneously in steps along the rail 12. Trolleys so advanced will be uniformly spaced from one another along the rail, provided, of course, that the impellers 64 are uniformly spaced upon the pusher rod. If many impellers are employed, additional carriages such as 54 may be applied to the pusher rod as may be required to maintain a parallel relationship of the pusher rod to trolley rail 12.

The device of the invention may be employed in various capacities to automate selection and movement of carcasses within a meat processing plant, with substantial savings of time, labor and expense. The in-line disposition of the pusher rod with relation to the fluid motor piston rod, facilitates and expedites installation of the device and greatly minimizes servicing thereof subsequently to installation. The in-line disposition of parts adapts the device to easy installation where limited space and head-room may present troublesome installation problems.

It is to be understood that various modifications and changes may be made in the structural details of the device without departing from the spirit of the invention.

What is claimed is:

1. Apparatus for advancing and spacing trolleys along a substantially horizontal trolley rail which rail is suspended from and spaced beneath an overhead stationary support member, said apparatus comprising: elongate track means; a substantially horizontal trolley rail, and means for suspending said trolley rail from and in spaced relation to said overhead support member and for suspending said elongate track means intermediate the support member and trolley rail; a motor including a drive rod alternately extendable and retractable by said motor; means mounting said motor in fixed relation to the overhead support member, with the drive rod thereof extendable within said space occupied by said track means, the drive rod being substantially parallel to said elongate track means; a reciprocable elongate pusher rod having opposite ends one of which is fixed to the drive rod of the motor, said pusher rod extending lengthwise of said track means and in parallelism with the trolley rail; a carriage movable along the track means and supporting said pusher rod; and impeller means carried by the pusher rod, including means to abut and impel a trolley in one direction only along the trolley rail.

2. Apparatus as specified by claim 1, wherein the carriage is a wheel-equipped carriage tractionally supported upon the track means aforesaid.

3. Apparatus as specified by claim 2, wherein the track means comprises a pair of elongate track members spaced apart, with each of said track members disposed in spaced parallelism above the trolley rail and beneath the support member therefor, said carriage being disposed astride said track members.

4. Apparatus as specified by claim 3, wherein the aforesaid means to abut and impel a trolley depends from the impeller means between said track members.

5. Apparatus as specified by claim 1, wherein is included means for securing the impeller means at selected locations along the length of the reciprocable pusher rod.

6. Apparatus as specified by claim 1, wherein the drive rod aforesaid is a piston rod, and the motor for extending and retracting said piston rod is a fluid-operated reversible motor operative to reciprocate said piston rod.

7. Apparatus as specified by claim 6, wherein the reciprocable pusher rod is fixed to the piston rod in endwise axial alignment therewith.

8. Apparatus as specified by claim 1, wherein said one end of the reciprocable pusher rod is aligned with the drive rod of the motor.

9. Apparatus as specified by claim 7, wherein the track means comprises a pair of elongate track members spaced apart, said track members being disposed in parallelism above the trolley rail and beneath the support member therefor, and said carriage includes a pair of anti-friction wheels each of which rides upon a track member.

10. Apparatus as specified by claim 9, wherein the aforesaid means to abut and impel a trolley depends from the impeller means between said parallel track members.

11. Apparatus as specified by claim 10, wherein is included means for securing the impeller means at selected locations along the length of the pusher rod.

12. Apparatus as specified by claim 1, wherein the aforesaid means to abut and impel a trolley, comprises an elongate drop finger having one end pivoted upon the impeller means carried by the pusher rod, the opposite free end of said drop finger being pendent from said pivot into the path of movement of a trolley moveable along the trolley rail, and cooperative means on the impeller means and said drop finger, for precluding pivoting of the drop finger from the pendent position in one direction only.

13. Apparatus as specified by claim 1, wherein the axes of the motor, the drive rod thereof, and that of the pusher rod, are all disposed beneath the level of the overhead stationary support member.

14. Apparatus as specified by claim 10, wherein the axes of the motor, the piston rod, and the elongate pusher rod, are axially aligned beneath the level of the overhead stationary support member.

References Cited
UNITED STATES PATENTS

| | | | |
|---|---|---|---|
| 1,522,116 | 1/1925 | Gray | 104—162 |
| 2,988,014 | 6/1961 | Pianowski | 104—162 |
| 3,122,243 | 2/1964 | Hawley | 104—162 X |
| 3,219,205 | 11/1965 | Grant | 104—162 X |

JAMES B. MARBERT, Primary Examiner

U.S. Cl. X.R.

104—250